O. W. COMPTON.
SPEED LIMITING DEVICE FOR MOTOR DRIVEN VEHICLES.
APPLICATION FILED MAY 6, 1915.
1,190,115.                                              Patented July 4, 1916.
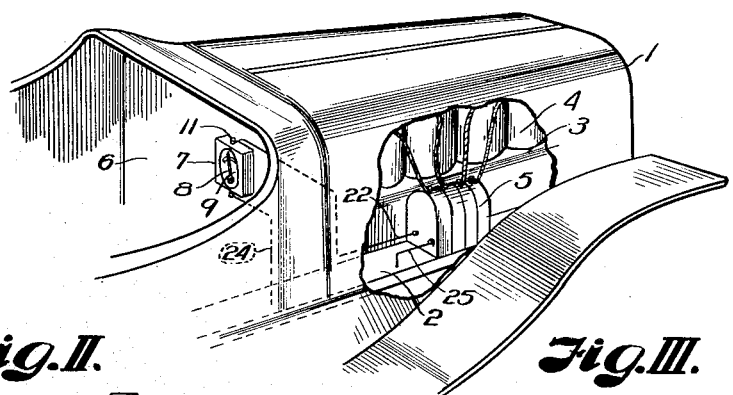
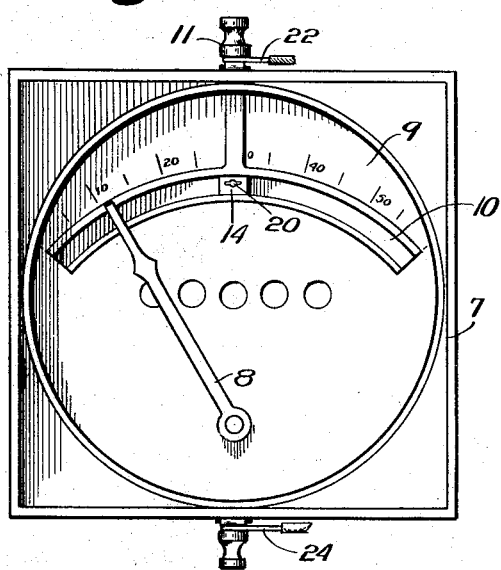
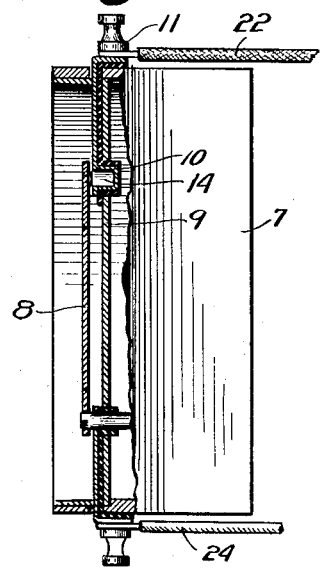
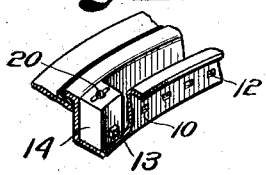
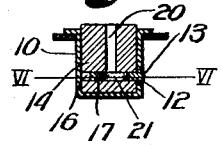
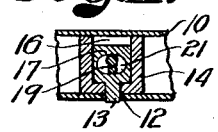
INVENTOR
O. W. Compton.
BY
Arthur E. Brown
ATTORNEY

UNITED STATES PATENT OFFICE.

ORVILLE W. COMPTON, OF INDEPENDENCE, KANSAS.

SPEED-LIMITING DEVICE FOR MOTOR-DRIVEN VEHICLES.

1,190,115.          Specification of Letters Patent.         Patented July 4, 1916.

Application filed May 6, 1915. Serial No. 26,443.

*To all whom it may concern:*

Be it known that I, ORVILLE W. COMPTON, a citizen of the United States, residing at Independence, in the county of Montgomery and State of Kansas, have invented certain new and useful Improvements in Speed-Limiting Devices for Motor-Driven Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a speed limiting device for motor driven vehicles, and has for its principal object to provide means for automatically discontinuing the operation of a motor when the vehicle driven thereby has reached a predetermined speed. In accomplishing this object I have provided improved details of structure, the preferred forms of which are illustrated in the accompanying drawings, wherein:—

Figure I is a perspective view of a portion of a motor driven vehicle equipped with my improvements. Fig. II is an enlarged face view of a speed indicator, showing the adjustable connection of a part of the control for my device assembled therewith. Fig. III is an edge view of the speed indicator; a part of the case being broken away for better illustration. Fig. IV is a detail perspective of the adjustable contact block, whereby a circuit is completed to effect the motor when the vehicle has reached a predetermined speed. Fig. V is a cross section of the same, particularly illustrating the means for locking the block in fixed position. Fig. VI is a sectional view on the line VI—VI, Fig. V.

Referring more in detail to the parts:—1 designates a motor driven vehicle of any ordinary construction, having a metal frame 2 and embodying a motor 3 of an explosive type, comprising the usual cylinders 4 having sparking devices that are energized from a magneto or the like 5. Mounted on the vehicle, preferably on the dash 6, is a speed indicator 7 comprising a pointer 8 which is adapted for travel over a dial 9 whereon the usual speed graduations are marked. Located adjacent the dial figures and arranged concentrically with the pointer 8 is a depressed track 10, having a binding post 11 in conductive relation thereto and provided with keyholes 12 adjacent the speed indicating numerals for receiving the bolt 13, which is contained within a block 14 that is slidably mounted in the track and adapted for movement to any position throughout the length thereof.

The block 14 comprises a chamber 16 within which the head 17 of the bolt 13 is located and adapted for movement, so that the bolt may be shot or drawn when the block is to be locked or unlocked at a fixed position relative to the speed indicating numerals; the locking and unlocking movement being accomplished by means of a key 19 which is adapted to extend through an opening 20 in the block into an oblong pocket 21 in the bolt head so that the bolt may be shot or drawn by manipulation of the key.

The binding post 11 carries a wire 22 whereby the track 10 is electrically connected with the magneto; the block 14 being of conductive material so that current may flow from the magneto to the block when the latter is in any position in the slide. The pointer 8 is also of conductive material, but insulated from the track 10, and has a circuit wire 24 grounded on the frame 2 so that current flowing through the wire and frame may pass through a grounded wire 25 to the magneto, and when the pointer is in contact with the block 14 will form a short circuit through the indicator and magneto and deprive the spark plugs in the engine cylinders of energy so that they will not ignite fuel charges therein.

In using the device, presuming the parts to be constructed and assembled as described, should the owner of the car desire to limit the speed at which it may travel to a certain rate per mile, he moves the contact block 14 to the point adjacent the numeral on the dial indicating such speed and locks the block in place, so that the rate of speed at which the vehicle may travel may not be varied after the device has been set. With the parts so arranged, when the car is traveling the pointer of the indicator moves across the dial until it reaches the block 14 with which it contacts to complete a circuit through the wire 22 leading to the magneto and the wire 24 leading to ground and through the ground member to the magneto thereby establishing a short circuit so that current instead of flowing to the spark plugs will pass idly through the indicator and ground.

It is apparent that the device may be set for any speed that may be determined by the owner of the car or the person holding the key to the contact block, and that when the block is set and locked the motor will be cut off when the speed has been reached.

While I have shown the device as adapted for acting on the spark plugs, it is apparent that auxiliary devices for cutting off the flow of fuel to the cylinders may be affected by the short circuit without departing from the spirit of my invention, which consists primarily of short circuiting the magneto, or its equivalent, automatically from the speed indicator.

Having thus described my invention, what I claim as new therein, and desire to secure by Letters-Patent, is:—

1. The combination with a vehicle, of a motor for driving the vehicle, a source of electrical supply, a grounded circuit leading through the source of supply for controlling an operative part of the motor, a speed indicator comprising a dial and track, a binding post conductively connected with the track, a slide on the track in conductive relation thereto, a pointer normally insulated from the track but adapted for conductive contact with the slide, and direct and grounded circuit wires for electrically connecting the indicator members with the source of electrical supply.

2. The combination with a vehicle, of a motor for driving the vehicle, a source of electrical supply, circuit connection between the source of supply and a part of the motor, a speed indicator comprising a dial, a track on said dial, electrical connection between the track and the source of supply, a block slidably mounted in the track, a bolt in said block adapted for locking engagement with the track, a pointer insulated from the dial and adapted for conductive contact with the block, and means for electrically connecting the pointer with the source of supply.

3. The combination with a vehicle, of a motor for driving the vehicle, a source of electrical supply, means for electrically energizing a member in operative relation with the motor from the source of electrical supply, a speed indicator comprising a dial having speed graduations thereon, a depressed track arranged adjacent the speed graduations, and having openings therein, a block slidably mounted in the track, a bolt in said block adapted for projection into said openings, means for electrically connecting the track with the source of electrical supply, a pointer adapted for contact with said block, and means for electrically connecting the pointer with the source of supply, for the purpose set forth.

In testimony whereof I affix my signature in presence of two witnesses.

ORVILLE W. COMPTON.

Witnesses:
W. R. MURROW,
ELMER BEELER.